United States Patent [19]
Wilson

[11] Patent Number: 5,161,765
[45] Date of Patent: Nov. 10, 1992

[54] MOVEABLE SEAT MOUNTING DEVICE

[75] Inventor: Joe E. Wilson, Creek County, Okla.

[73] Assignee: Aero Tech United Corporation, Springdale, Ark.

[21] Appl. No.: 664,537

[22] Filed: Mar. 4, 1991

[51] Int. Cl.⁵ .......................................... F16M 13/00
[52] U.S. Cl. .................................. 248/425; 296/65.1; 297/344; 297/349
[58] Field of Search ............... 248/416, 419, 424, 425; 297/344, 349; 296/65.1

[56] References Cited

U.S. PATENT DOCUMENTS

| | | | |
|---|---|---|---|
| 3,890,283 | 1/1975 | Colautti | 297/349 X |
| 4,705,256 | 11/1987 | Hofrichter | 248/425 X |
| 4,792,188 | 12/1988 | Kawashima | 297/349 |
| 4,802,706 | 2/1989 | Onimaru et al. | 248/425 X |
| 4,844,543 | 2/1989 | Ochiai | 297/344 X |

FOREIGN PATENT DOCUMENTS

0191637 11/1983 Japan ....................... 297/344

Primary Examiner—Ramon O. Ramirez
Attorney, Agent, or Firm—Head and Johnson

[57] ABSTRACT

A seat mounting that allows omnidirectional movement of the seat in a single plane by means of two pairs of sliding rods, one pair perpendicular to the other, and a rotatable disc. Rods are locked and released by a series of skewed locker-like pieces that may be moved by a cam mechanism. The rotational disc is locked and released by a pin that extends through the disc into an underlying hole. Locking and release mechanisms are controlled by a single cable.

9 Claims, 8 Drawing Sheets

MOVEABLE SEAT MOUNTING DEVICE

BACKGROUND OF THE INVENTION

1. Field of the Invention:

The invention relates to movably mounted seats that can be adjusted in multiple directions in a given plane.

2. Description of the Related Art:

Most moveable seat bases allow movement in a limited number of direction in a given plane, i.e. back and forth, side-to-side, and/or rotational. Some bases do allow motion in all directions (omnidirectional) in a given plane (uniplanar). Some require separate controls for each direction of movement, others may have a single control means. Various types of movement means have been described, such as pads, rails, and the like.

Moveable seats are used in many vehicles (cars, trucks, airplanes, etc.) and require stability, ease of movement, and strength. This protects the operator and allows him to move the seat while he is engaged in other operations.

Some of the problems encountered with the related art are: excessive friction during movement resulting in undue drag; locking devices which slip under excessive load; objectionable noises during movement. These problems are solved with the invention herein.

SUMMARY OF THE INVENTION

It is the object of this invention to provide a chair base that is moveable in any direction (omnidirectional) in a given plane (uniplanar) and has a single selective movement locking and release control mechanism. This is accomplished by using two pairs of support rods: a first pair of parallel support rods (in the Y-axis) on which a second pair of parallel support rods (in the X-axis) is slidably mounted and which are disposed perpendicularly to each other. The first pair of support rods is mounted in the base of a seat and the second pair of support rods are slidable thereon by means of sleeves. The second pair of support rods is also slidably mounted in a housing attached to a rotatable disc. Thus movement in the X and Y axes, as well as rotational movement is achieved simultaneously. The planes of movement are parallel to the seat base.

In the preferred embodiment, the rods have spring-loaded locking washers which prevent movement until released, and the disc has a spring-loaded locking pin which also prevents rotational movement until release. Release is by means of a single control cable which releases all moveable means at once.

DESCRIPTION OF THE PREFERRED EMBODIMENT

Figure 1:
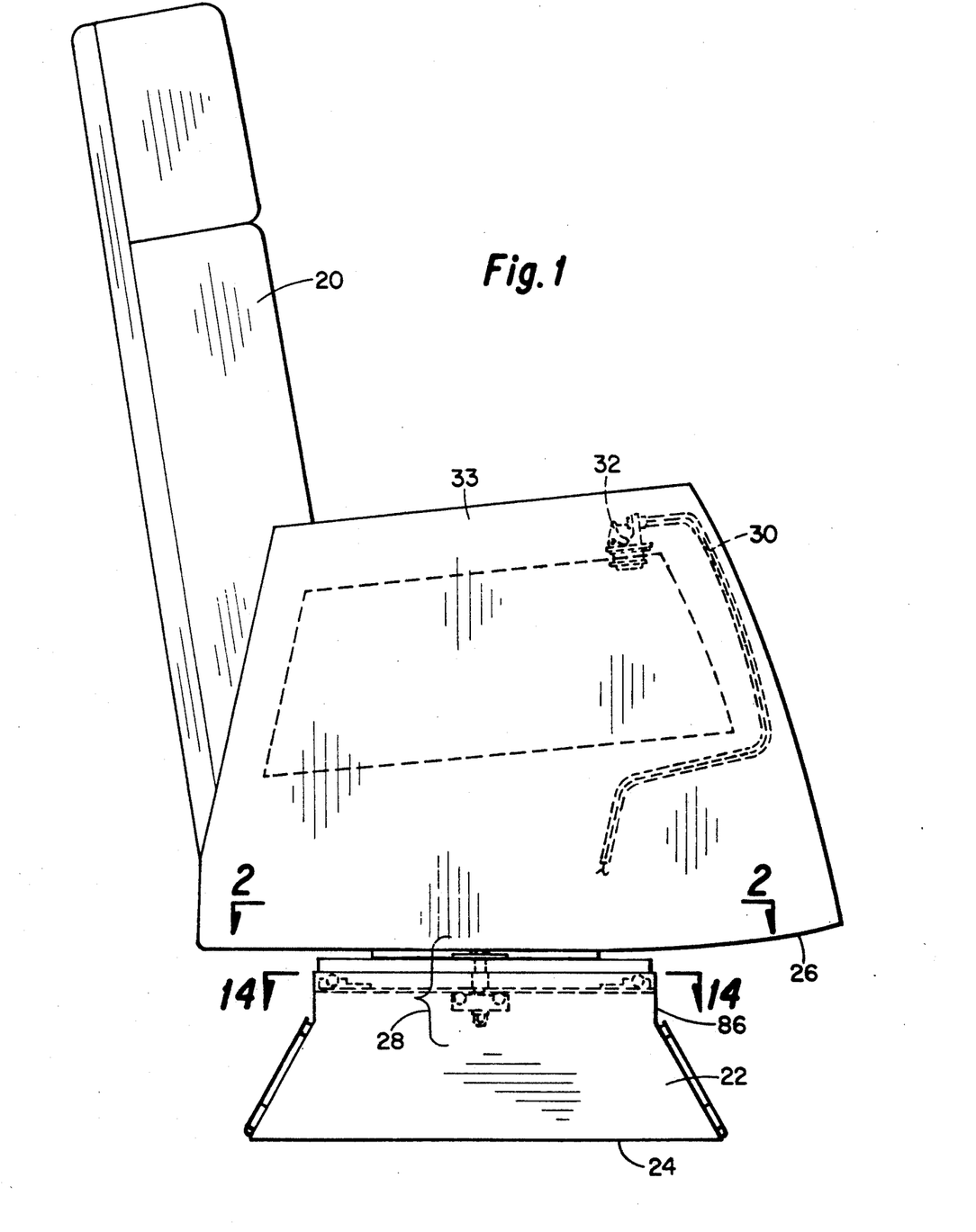
FIG. 1 is a side view of a chair mounted on a pedestal.

FIG. 1 illustrates a seat or chair 20 movably supported on a pedestal 22 which is secured to the floor (not shown) of a vehicle, airplane, or other structure, at the pedestal base 24. The base of the seat 26 is mounted on a moveable means 28 which is contained within the seat base 26 and the pedestal 22. The moveable means 28 is controlled by a cable 30 which has a lever or release button 32 attached to one end of the cable 30 in the arm rest 33 of seat 20. The cable 30 runs from the release lever 32 to the movement means 28 where it selectively locks or releases the various movement means 28.

Figure 2:
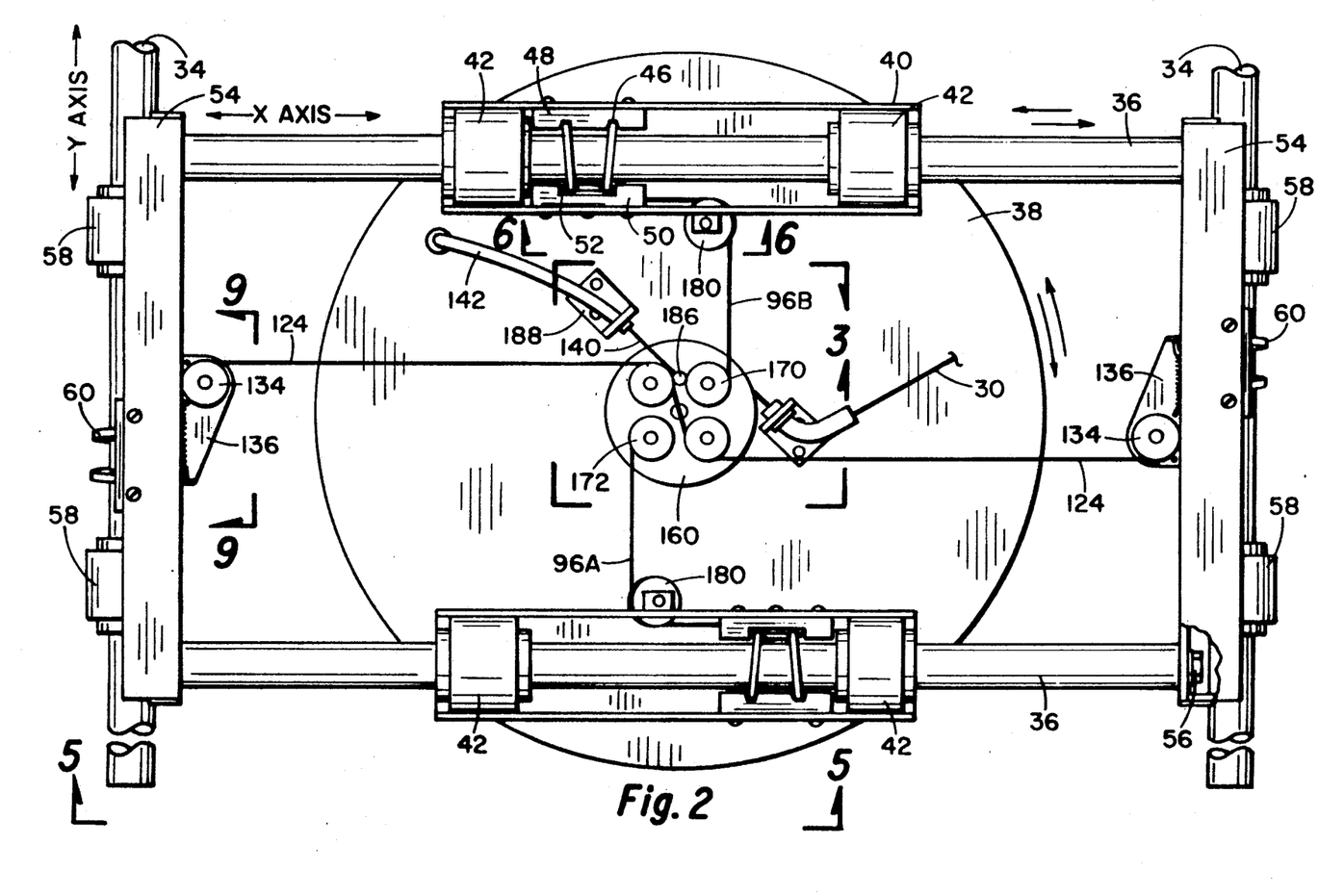
FIG. 2 is a top view of the pedestal at line 2—2 as shown in FIG. 1.

Attention is now directed to FIG. 2 in which the movement means 28 is illustrated in detail. This includes two pairs of support rods and a rotatable disc. A first pair of parallel support rods 34 is attached to the seat base 26 (FIG. 1) and extend in a direction labeled herein as the Y-axis. A second pair of parallel support rods 36 is slidably mounted perpendicular to the first pair of parallel support rods 34, in a direction herein labeled the X-axis, which is in a plane spaced from but parallel to the plane of the first pair of parallel support rods 34. The second pair of parallel support rods 36 is slidably supported on a rotatable disc 38. This disc 38 is rotatable in either a clockwise or counter-clockwise direction in a plane spaced from but parallel to the planes of the first pair of parallel support rods 34 and also to the second pair of parallel support rods 36.

Figure 5:
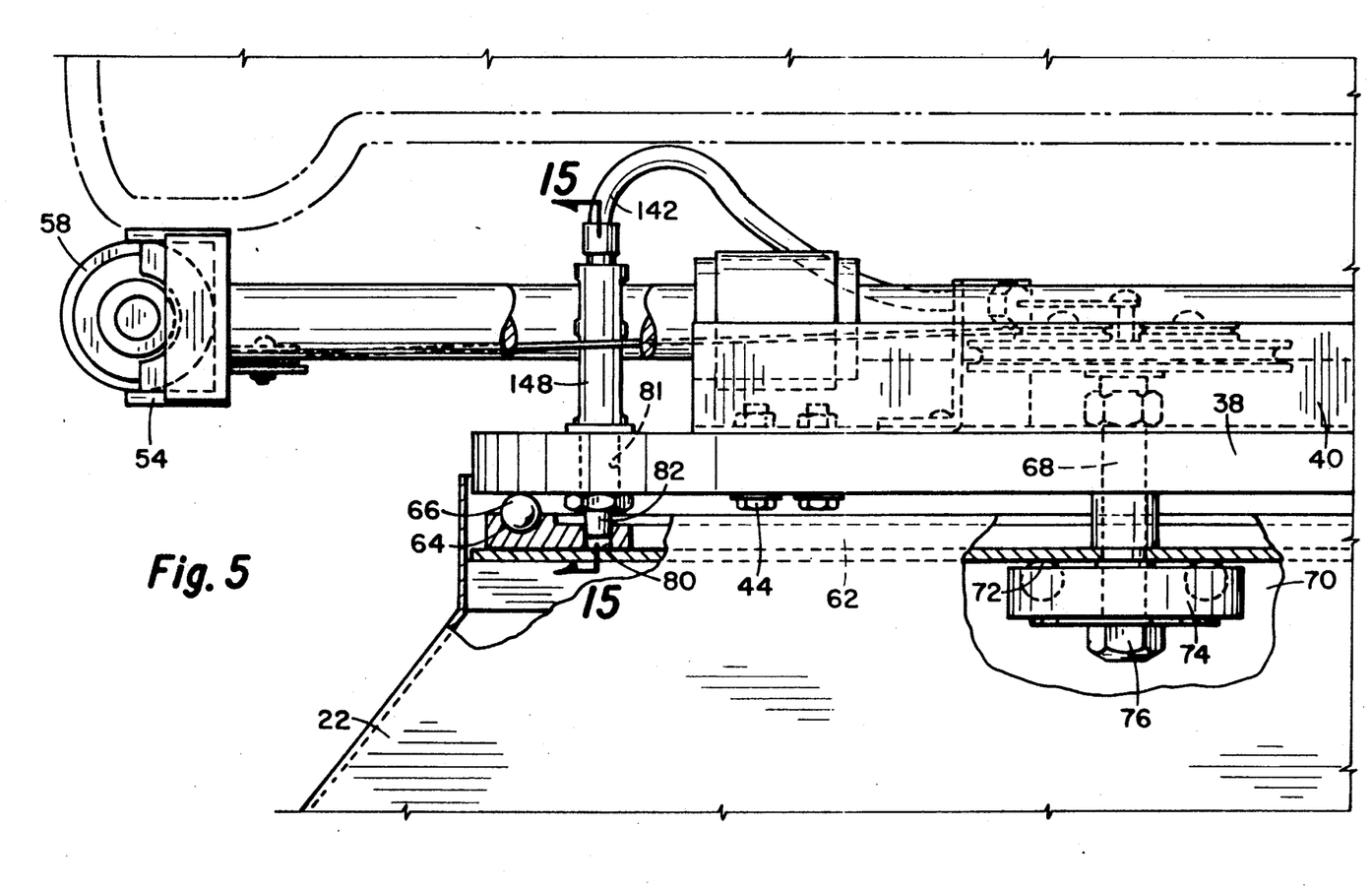
FIG. 5 is a side view of the pedestal at line 5—5 in FIG. 2.

Still referring to FIG. 2, the second pair of parallel support rods 36 are supported in a housing 40. Sleeves 42 are mounted in housing 40 and slidably encircle rods 42. FIG. 5 illustrates the housing 40 mounted on the disc 38 by screws 44, in a side view. Returning to FIG. 2, the housing 40 also contains the locking means for the X-axis rods 36. This means is shown as one or more washer-like members 46 which are mounted circumjacent to the rods 36. When the washer-like members 46 are in a skewed position they frictionally engage the rod 36 and prevent movement; when the washer-like members 46 are in a perpendicular position with respect to the rods 36 the rods are free to move. The washer-like members 46 are held in the housing 40 by a spacing plate 48, which holds one edge of each washer-like member 46 at a given point on the periphery of the rod 36, and by a second locking plate 50 which holds the other side of the washer-like member 46 in a skewed position by means of springs 52 which urge the washer-like members 46 into a skewed position. The releasing means will be discussed below.

Figure 9:
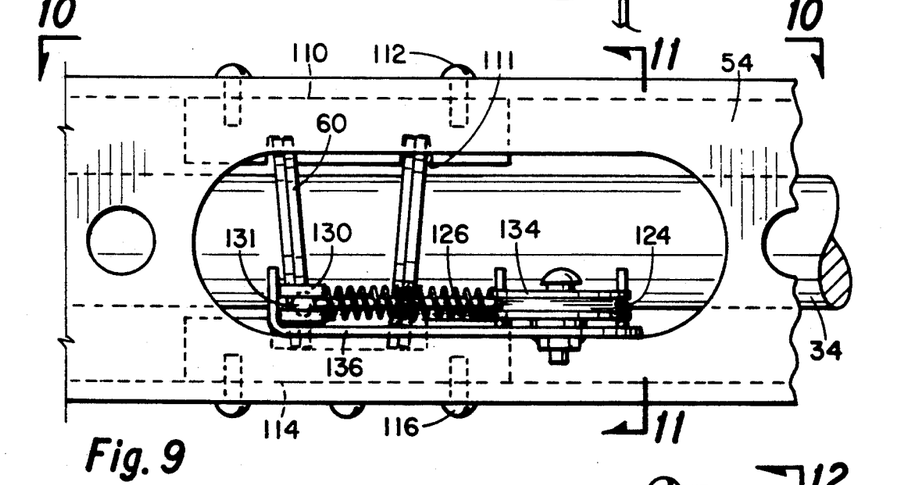
FIG. 9 is a side view (from the center of the base) of the rod locking mechanism at line 9—9 of FIG. 2.
Figure 10:
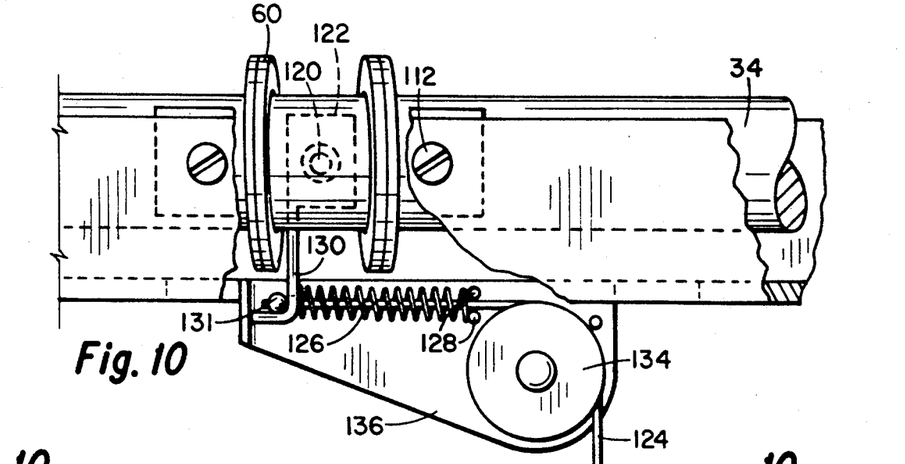
FIG. 10 is a top view of the rod locking mechanism at line 10—10 in FIG. 9.
Figure 11:
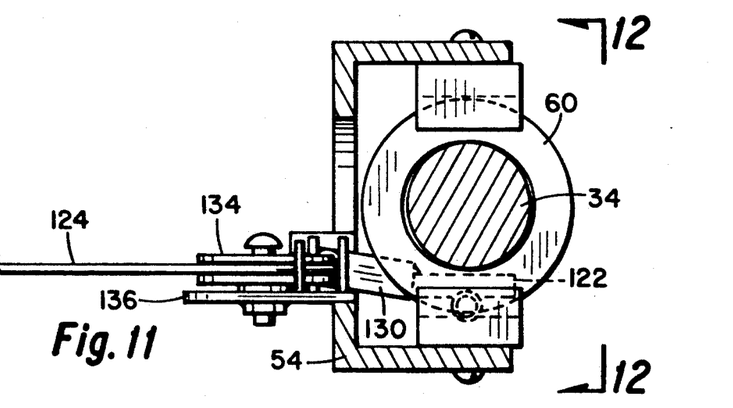
FIG. 11 is a cross sectional end view of the rod locking mechanism at line 11—11 in FIG. 9.
Figure 12:
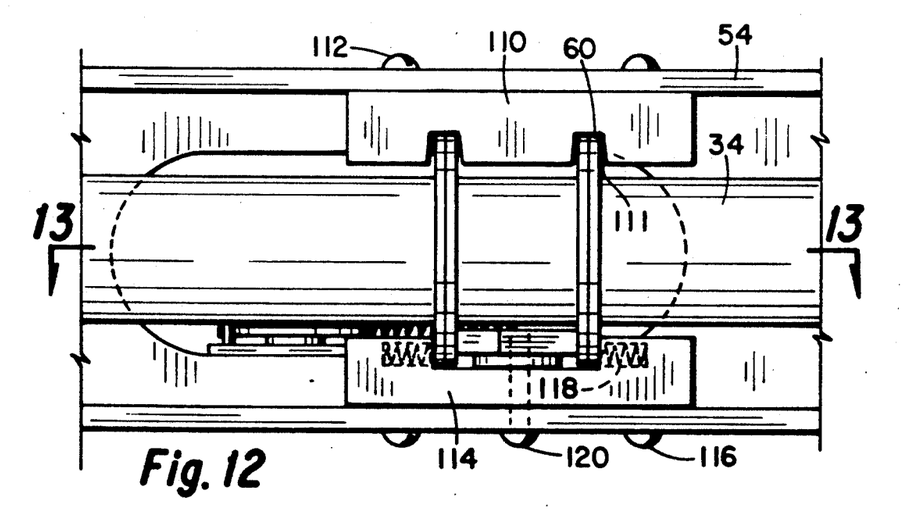
FIG. 12 is a side view (from the outside) of the rod locking mechanism at line 12—12 of FIG. 11.
Figure 13:
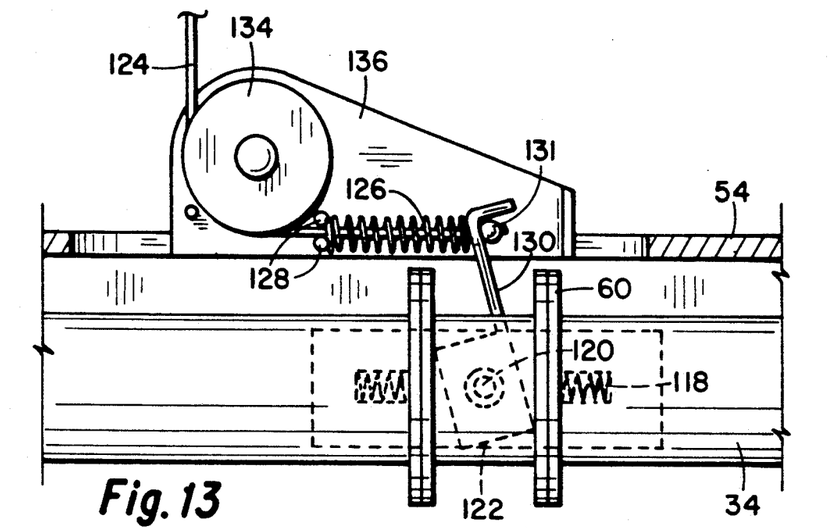
FIG. 13 is a sectional top view of the rod locking mechanism at line 13—13 of FIG. 12.

Still referring to FIG. 2, the second pair of parallel support rods 36 have a bracket 54 attached to the ends of the rods 36 by a bolt 56. This bracket 54 may be C-shaped, and may be formed of metal or other suitable material. Attached to the brackets 54 are sleeves 58 which slidably hold the first pair of support rods 34 in the Y-axis (the bracket 54 and sleeve 58 are seen in side view in FIG. 5). The locking washer-like members 60 for the first pair of parallel rods 34, as seen in FIG. 2, and are mounted in bracket 54 and will be seen more fully when FIG. 9 is discussed.

Thus, at this point it is shown that the first pair of parallel support rods 34 is attached to the base of seat 26 and can slide in the Y-axis direction through the sleeves 58 mounted in bracket 54 which is attached to the ends of the second pair of parallel support rods 36. The second pair of support rods 36 can move in the X-axis direction by sliding in the sleeves 42 mounted in the housing 40 which is mounted on the rotatable disc 38. The allowable movement in the X-axis and in the Y-axis, and combinations thereof, permits movement in any linear direction in the movement plane.

Figure 14:
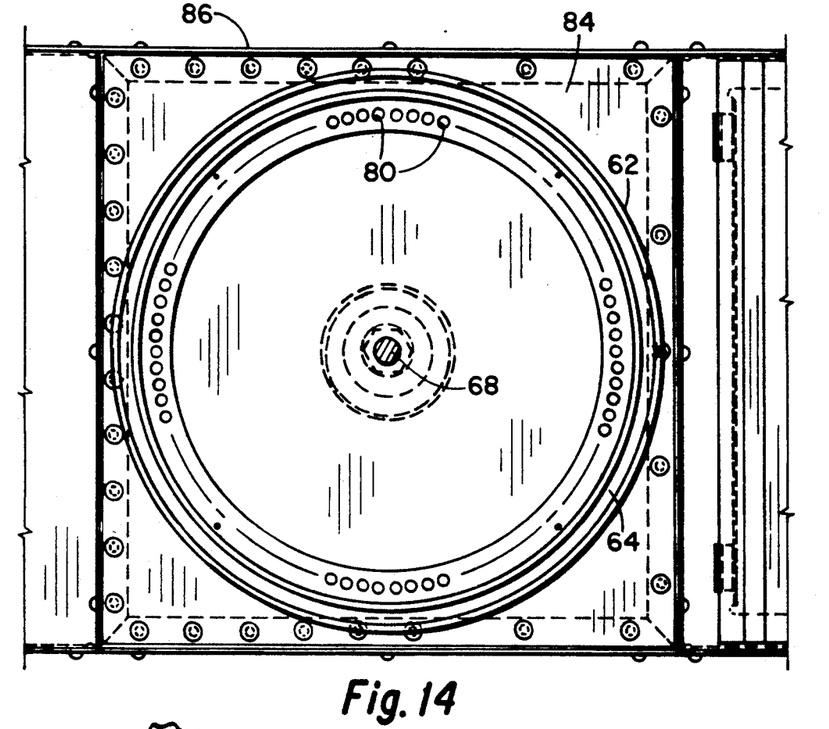
FIG. 14 is a top view of the rotational base plate at line 14—14 of FIG. 1.

The rotational component of the allowable movement is supplied by the rotatable disc 36 as shown especially in FIGS. 5 and 14. This is essentially a "lazy susan" type of arrangement with the rotatable disc 38 mounted on a second disc or member 62 supported in a non-moveable relationship with the chair pedestal 24. The second disc 62 has a race 64 in which bearings 66 are placed to support the rotatable disc 38 mounted thereon. The rotatable disc 38 rotates around a central pin 68 which extends through the second disc 62 and is rotatable against the base of the second disc 62, as shown at area 70 in FIG. 5, where bearings 72 are contained in the plate 74 attached to the pin 68. The plate 74 is held on the pin 68, and against the second disc 62, by a nut 76.

The second disc 62 has a series of holes 80 around the periphery (best seen in FIG. 14) which accepts a locking pin 82 (best seen in FIGS. 5 and 15) which locks the rotatable disc 38 in a non-moveable position when the pin 82 is engaged in one of the holes 80 in the second disc 62. These plates may be formed of metal, or of other suitable material. It is not necessary that the second disc 62 be circular. The second disc 62 may be the base of the movement means 28 or, as illustrated in FIG. 14, it may rest on a plate 84 which is fastened inside the pedestal housing 86.

The occupant of the chair may now move in all directions (omnidirectional) in a given plane (uniplanar). The rods 34 & 36 allow motion in the X and Y axes and the disc 38 allows rotational movement. The plane of movement is parallel to the seat base 26.

Figure 6:
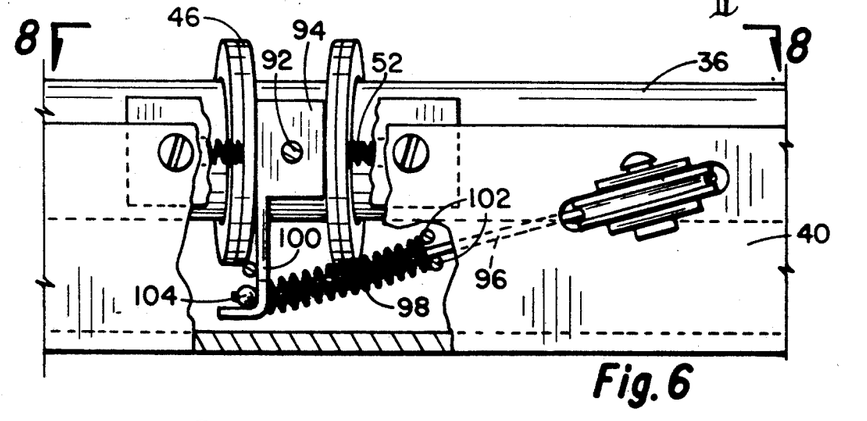
FIG. 6 is a side view (from the center of the base) at line 6—6 in FIG. 2 showing the rod locking mechanism in locked position.
Figure 7:
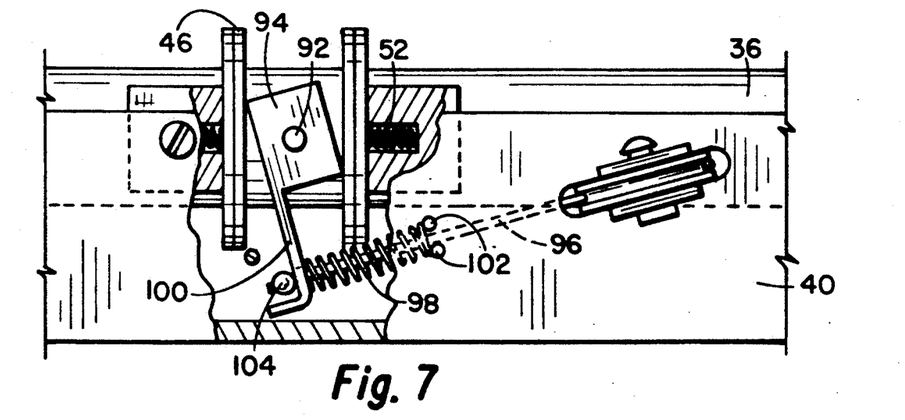
FIG. 7 is the same as FIG. 6, but with the rod locking mechanism in the unlocked position.
Figure 8:
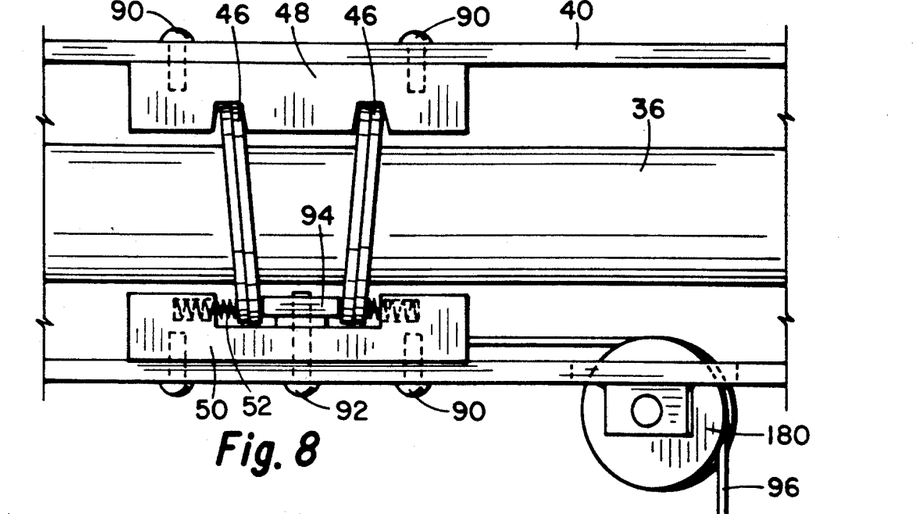
FIG. 8 is a top view of the rod locking mechanism at line 8—8 in FIG. 6.

The locking and release mechanisms will now be described. The locking and release mechanisms for the second pair of parallel support rods 36 (in X-axis) is best illustrated in FIGS. 6, 7 & 8. These are detailed views of the mechanisms as seen in FIG. 2 and briefly described above. FIG. 8 is a top view of the mechanism showing the housing 40 which contains a spacing plate 48 and a locking plate 50 with washer-like members 46 disposed between them, and surrounding (circumjacent to) the rod 36. In FIG. 8, the washer-like members are skewed by the springs 52 which are mounted in locking plate 50 thus frictionally engaging rod 36 and preventing slidable movement when in this position. It is noted that rivets 90 (or other attachment means) are used to affix the spacing plate 48 and locking plate 50 to housing 40. In addition, locking plate 50 has a pivot point screw, or pin 92.

FIG. 6 is a side view of the locking mechanism described above and illustrated in FIG. 8. The end of the pivot point screw 92 around which a cam-member 94 can pivot is shown. In FIG. 6, cam-member 94 is perpendicular to rod 36, and washer-like members 46 are skewed locking rod 36 in place. In FIG. 7, the same view as FIG. 6 is shown, but here washer-like members 46 are not skewed, but are perpendicular to rod 36, thus freeing rod 36 for movement. This is accomplished by a cable (or cord) 96 which, when pulled, compresses the spring 98 and pulls the cam arm 100 into a position not perpendicular to rod 36 twisting cam-member 94 around the pivot point screw 92 so that it forces the washer-like members 46 apart, against springs 52, with the result that washer-like members 46 are perpendicular to rod 36 which is now slidably movable in the lumen of the washer-like member 46. An additional structure in FIGS. 6 and 7 includes pins 102 which are mounted in the housing 40 and restrain spring 98. When pressure is released from the cable 96 spring 98 pushes against pins 102 and cam arm 100 forcing cam-member 94 into the position of FIG. 6 (i.e. the locked position). The cable 96 passes through the cam arm 100 and is retained there by a ball 104 attached to the end of cable 96.

Turning now to the locking and release mechanisms for the first pair of parallel support rods 34 in the Y-axis, which are illustrated in FIGS. 9, 10, 11, 12 and 13. This is very similar to the mechanism just described for the X-axis rods 36. FIG. 9 is a side view of the mechanism showing the washer-like members 60 in a skewed (locked) position on rod 34. A spacing plate 110 with grooves 111 for retaining the washer-like members 60 is present on one side attached to bracket 54 by rivets 112. On the other side, a locking plate 114 receives the other side of the washer-like members 60 and is fastened to the bracket 54 by rivets 116, or other fastening means. The locking plate 114 has springs 118 within it (best seen in FIG. 12 and 13) which force the washer-like members 60 into a skewed (locked) position. A pivot pin 120 extends through the locking plate 114 and rotatably secures a pivotal cam member 122. When cable 124 is pulled, spring 126 is compressed against retaining pins 128 pulling the cam arm 130 causing the cam member 122 to turn around the pivot pin 120 forcing the washer-like members 60 outward against the springs 118 into a position perpendicular to the rods 34 releasing it to slide in the lumen of the washer-like member 60. The cable 124 extends through the cam arm 130 and is retained therein by a ball 131 attached to the end of cable 124. The pins 128 and the pulley 134 are mounted on a flange 136 which is mounted on bracket 54. Thus, when cable 124 is in the relaxed position, the washer-like members are skewed, and lock rod 34 in place. Pulling on cable 124 unlocks rod 34, as described above.

Figures 15, 16:
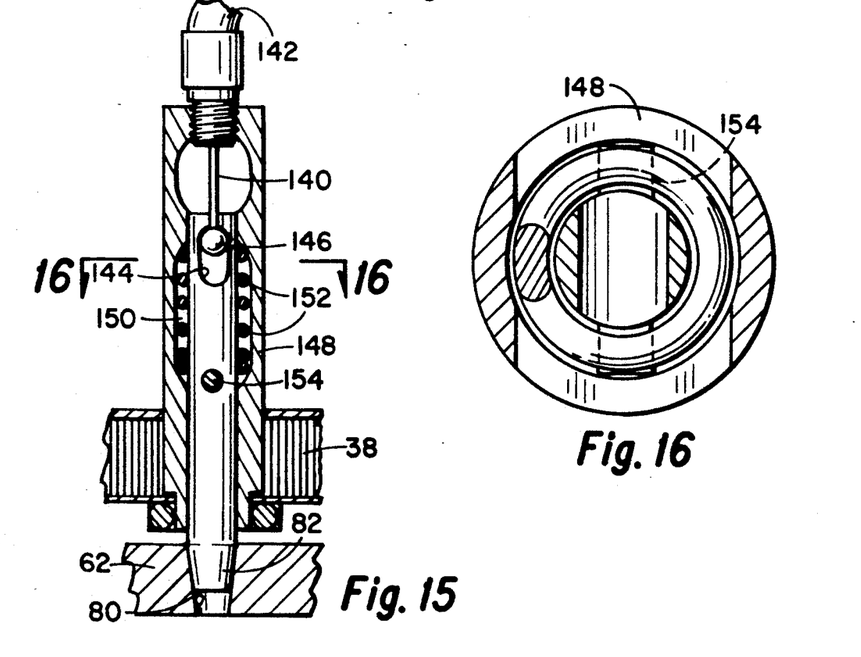
FIG. 15 is a cut away longitudinal sectional view of the locking pin at line 15—15 in FIG. 5.
FIG. 16 is a cross sectional view of the locking pin at line 16—16 in FIG. 15.

The locking and release mechanism for the rotatable disc 38 has been mentioned above. This consists of a pin 82 which extends through a hole 81 in the rotatable disc 38 and extends into a hole 80 in the underlying plate 62. This is seen in FIGS. 5, 14 15 and 16. FIG. 16 shows the locking means in cross sectional detail. A hole 80 in plate 62 holds the pin 82. The pin 82 is attached to a cable 140. Cable 140 comes through the cable housing 142, and is held in a slot 144 in pin 82 by a ball 146 attached to the end of cable 140. This is all enclosed in a pin housing 148 which has a space 150 surrounding pin 82 in which there is a spring 152 that normally forces pin 82 downward into the hole 80 of the underlying plate 62. The spring pushes against a crosspiece 154 that extends through the shaft of pin 82. When the cable 140 is pulled, the shaft of pin 82 is urged upward, and the crosspiece 154 compresses the spring 152. Thus the end of pin 82 is pulled from hole 80 in plate 62 allowing rotatable disc 38 to turn freely on bearings 66 in the race 64 of the non-rotating base 62.

Figure 3:
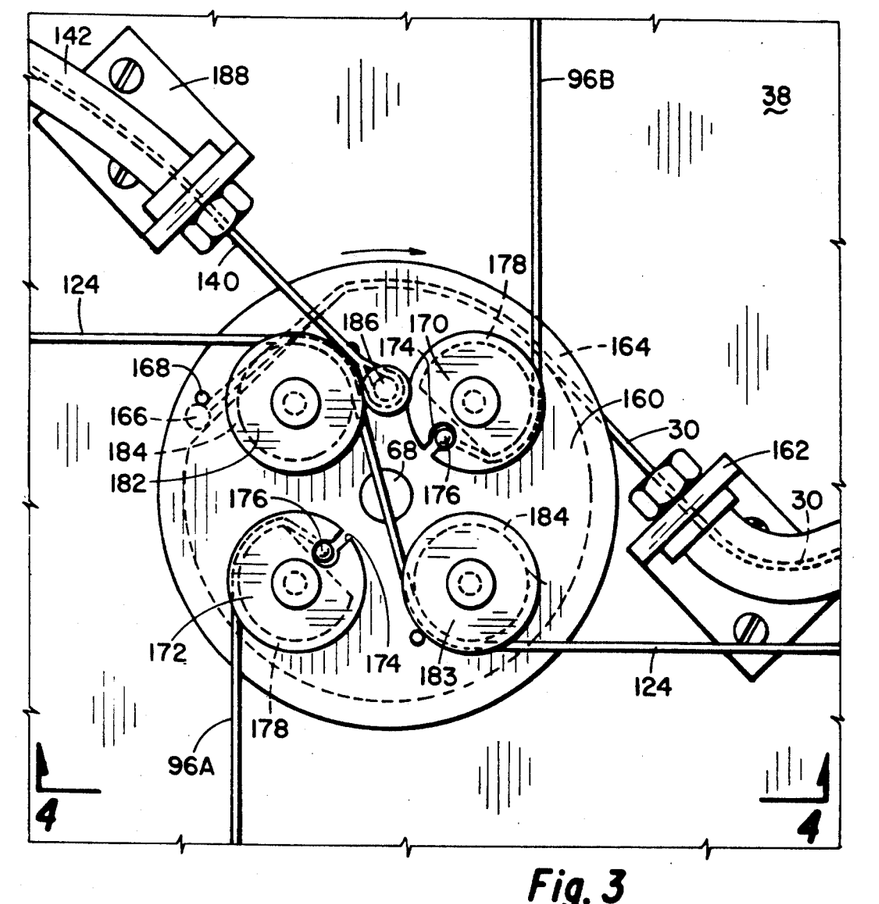
FIG. 3 is a detailed top view of the outlined area in FIG. 2.
Figure 4:
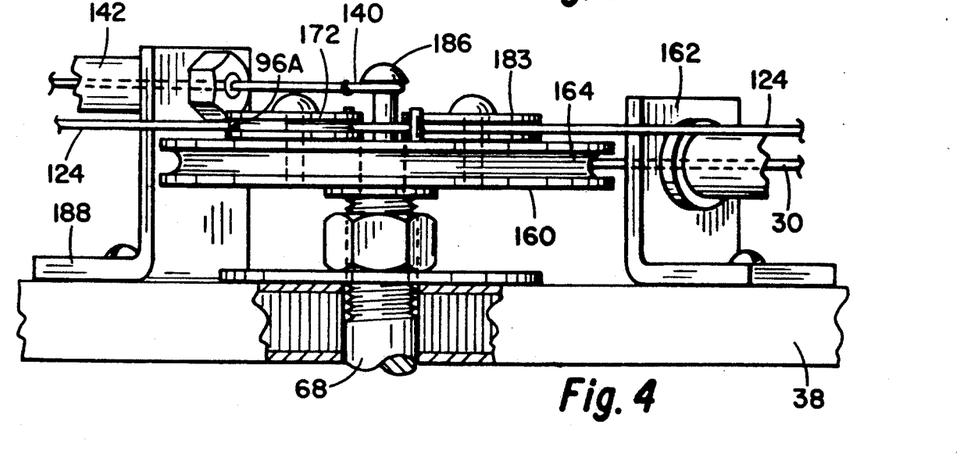
FIG. 4 is a side view of the control disc at line 4—4 in FIG. 3.

Now the means by which the locking and release mechanisms are controlled for the entire device is examined. FIG. 3 is a detailed view of the center of the rotatable disc 38 as seen in FIG. 2. A control disc 160 is pivotally mounted on the central pin 68. The shielded cable 30 (shown in the arm of the seat 20 in FIG. 1) is mounted at 162 on rotatable disc 38 and cable 30 enters a groove 164 on the edge of the control disc 160 (this is shaped like a pulley as seen in side view in FIG. 4) and is secured by a ball 166 on the end of cable 30 which is held in groove 164 by a pin 168 that forms a slot with the side of the groove that is smaller than ball 166. Thus, pulling on cable 30 in the arm rest 33 of seat 20 turns control disc 160 in a clockwise direction.

Mounted on the control disc 160 are four sub-discs 170, 172, 182, and 183 fixed to control disc 160. Two of the sub-discs 170 and 172 are attachments for the cables 96A and 96B. Cable 96A and 96B respectively control the locking and release means on one each of the second pair of parallel support rods 36 in the X-axis. As shown in FIG. 3, the cables 96A and 96B are held in a key-hole slot 174 in sub-discs 170 and 172 by a ball 176 which is attached to the end of the cables 96A and 96B and fits in a groove 178 around sub-discs 170 and 172. Referring now to FIG. 2, we see that cables 96A and 96B extend from sub-discs 170 and 172 toward rods 36 and around a pulley 180 and thence to the cam-arm 100 for each rod as described above in FIGS. 6, 7 and 8.

Returning now to FIG. 3, there are a second pair of fixed sub-discs 182 and 183 around which cable 124 travels in a Z-like path, in a groove 184 in the edges of sub-discs 182 and 183. Referring back to FIG. 2, it is seen that cable 124 extends to the first pair of parallel support rods 34 in the Y-axis. The cable 124 travels around a pulley 134 attached to flange 136 as illustrated and described for FIGS. 10 and 13. The cable then is attached and ends in a ball 131 in the cam-arm 130 as shown (and described above) in FIG. 9, 10, 11, 12 and 13.

Again, referring back to FIG. 3. Another cable 140 is attached to a pin 186 which is fixed to the control disc 160. This cable 140 enters a housing 142 which is fastened to rotatable disc 38 by a mount 188. The cable 140 and housing 142 then extend to the locking pin 82, as shown in detail in FIG. 15, and described above.

Functionally, this system of cables and discs works as follows. The main cable 30 is pulled (or otherwise shortened) by a lever 32 in the arm 33 of the seat 20. This pulling causes control disc 160 to rotate in a clockwise direction. Sub-discs 170 and 172 turn with control disc 160 and pull on cables 96A and 96B causing cables 96A and 96B to pull cam-arms 100 unlocking washer-like member 46 on each of the second pair of rods 36 allowing the rods 36 to slide in the X-axis. At the same time, sub-discs 182 and 183 also are turning with control disc 160 thus causing cable 124 to shorten linearly so that cable 124 pulls on cam-arms 130 unlocking washer-like members 60 on the first pair of rods 34 allowing them to move in the Y-axis. Simultaneously with the release of rods 34 and 36 above, pin 186 also turns with control disc 160 pulling on cable 140 which causes locking pin 82 to retract from hole 80 in support plate 62 freeing rotatable disc 38 for movement in both clockwise or counterclockwise directions.

When the main control cable 30 is released, the tension on cables 96A and 96B, 124, and 140 (caused by springs 98, 126, and 152) causes the control disc 160 to rotate counterclockwise, back to the starting position, allowing all of the locking mechanisms to reengage and stop movement.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An uniplanar omnidirectional adjustable device for supporting a seat with a base, comprising:
    a first pair of parallel support rods fixed to the base of said seat;
    a second pair of parallel support rods aligned perpendicular to said first pair of parallel support rods and slidably attached thereto;
    a rotatable disc on which said second pair of parallel support rods is slidably mounted; and
    means for selectively locking and releasing said first and second pairs of parallel support rods and said rotatable disc to selectively prevent and permit movement of said seat base thereon.

2. The device, as recited in claim 1, wherein said slidable mounting of said second pair of parallel support rods is a housing attached to said rotatable disc containing sleeves which fit around said second pair of support rods allowing them to move in a plane spaced from and parallel to said rotatable disc, and in a direction parallel to said second pair of support rods.

3. The device, as recited in claim 1, wherein said rotatable disc, said first pair of parallel support rods, and said second pair of parallel support rods are all in planes parallel to and spaced from each other.

4. The device, as recited in claim 1, wherein said means for locking said first and second pairs of parallel support rods is a series of spring skewed locker-like members supported in a housing and circumjacently mounted on said rods and which frictionally engage said rods when in the skewed (locked) position.

5. The device, as recited in claim 4, wherein said means for releasing said first and second pairs of parallel support rods is a cam mechanism supported in said housing and which is cable activated and which forces said locker-like members into a non-skewed position, thus releasing said rods.

6. The device, as recited in claim 1, including a member underlying said disc and supported from said base in a non-movable relationship and wherein said means for locking said rotatable disc is a spring activated pin which extends through a hole in said rotatable disc, into one of a plurality of holes in said underlying non-moveable member.

7. The device, as recited in claim 1, wherein said means for releasing said first and second pairs of parallel support rods and said rotatable disc locking means to a single cable release mechanism.

8. A multidirectional adjusting support device for a seat comprising:

a first pair of parallel support rods fixed to the base of a seat;

a second pair of parallel support rods aligned perpendicular to said first pair of parallel support rods and slidably attached thereto;

a pair of brackets attached across the ends of said second pair of parallel support rods and with said brackets containing at least one sleeve in each to provide said slidable attachment to said first pair of parallel support rods;

a pedestal base;

a disc that is rotatable from said pedestal base and on which said second pair of parallel support rods are slidably mounted;

two housing members mounted on said rotatable disc each of which contains at least one sleeve for slidably mounting said second pair of parallel support rods thereon;

a least one washer-like member circumjacently mounted on each of said first and second pairs of rods, and spring activated so as to assume a skewed position frictionally engaging said rods and thus locking them;

a cam member rotatably mounted on each said housing members adjacent to each of said washer-like members such that rotation thereof will force said washer-like members into a non-skewed position thus freeing said rods for movement;

a non-movable support plate mounted below said rotatable disc, and supporting said disc by a plurality of bearings contained in a circumferential race around the periphery of said support plate;

at least one pin mounted on said rotatable disc and extending through said disc to enter a hole in said underlying support plate, thus preventing rotation of said disc, and such pin further being forced into said hole engaging position by a spring; and a plurality of cable connection means on said rotatable disc, that when pulled cause said cams and said pin to release said rods and disc thus allowing movement.

9. The multidirectional seat adjusting support device of claim 8 wherein said plurality of cable connection means on said rotatable disc comprise:

a release cable with two ends, the first end attached to the periphery of said rotatable disc and the second end of said release cable attached to the arm of said seat such that when said second end of the release cable is pulled said first end causes said rotatable disc to rotate in a clockwise direction;

a first pair of sub-discs fixed to said rotatable disc and an Y-axis cable having two ends and a central portion with one end attached to one said cam-member and the other end attached to the other cam-member in the housings of said first pair of parallel support rods in the Y-axis, and with the central portion of said Y-axis cable looped in a Z-configuration around said first pair of sub-discs such that when said rotatable disc is turned, said first pair of sub-discs also move and shorten said Y-axis cable; and a second pair of sub-discs fixed to said rotatable disc and a pair of X-axis cables, each cable having two ends with one end of each attached peripherally to one of said second pair of sub-discs and the other end of each X-axis cable attached to one of said cam member on said second pair of parallel support rods in the X-axis such that turning said rotatable disc also turns said second pair of sub-discs thus pulling on said X-axis cables.

* * * * *